(12) United States Patent
McCann

(10) Patent No.: US 9,567,897 B2
(45) Date of Patent: *Feb. 14, 2017

(54) OXYGENATE COMPOUND SYNTHESIS DEVICE, SYSTEMS INCLUDING THE DEVICE, AND METHODS OF USING THE SAME

(71) Applicant: David McCann, Kent, WA (US)

(72) Inventor: David McCann, Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/670,333

(22) Filed: Mar. 26, 2015

(65) Prior Publication Data

US 2015/0198085 A1   Jul. 16, 2015

Related U.S. Application Data

(63) Continuation of application No. 13/772,244, filed on Feb. 20, 2013, now Pat. No. 8,991,368.

(Continued)

(51) Int. Cl.
*F02B 1/12* (2006.01)
*F02B 51/02* (2006.01)
(Continued)

(52) U.S. Cl.
CPC .................. *F02B 51/02* (2013.01); *B01J 8/06* (2013.01); *F02B 43/08* (2013.01); *F02B 47/06* (2013.01);
(Continued)

(58) Field of Classification Search
CPC ........... F02B 51/02; F02B 43/08; F02B 47/06; F02B 29/0437; F02M 25/00; F02M 21/0215; F02M 25/12; B01J 8/06; B01J 2208/06; F02G 5/00; Y02T 10/32; Y02T 10/121; F01J 2208/00106; F01J 2208/00389
(Continued)

(56) References Cited

U.S. PATENT DOCUMENTS

| 4,070,993 A | 1/1978 | Chen |
| 4,341,069 A | 7/1982 | Bell et al. |

(Continued)

FOREIGN PATENT DOCUMENTS

| EP | 0409086 A1 | 1/1991 |
| WO | WO 96/23755 | 8/1996 |

OTHER PUBLICATIONS

Unknown, downloaded from http://www.thermaline.com/shelltubeheatexchangers.htm, 2 pages, obtained on Jan. 31, 2012.

(Continued)

*Primary Examiner* — Marguerite McMahon
(74) *Attorney, Agent, or Firm* — Lewis Roca Rothgerber Christie LLP

(57) ABSTRACT

Devices, systems and methods for the preparation of an oxygenate compound or mixture of oxygenate compounds suitable for use in internal combustion engines are disclosed. An internal combustion engine system includes: a fuel system including an oxygenate compound synthesis device including a reactor including a catalyst, the oxygenate compound synthesis device being configured to convert at least a portion of a feedstock to an oxygenate compound or a mixture of oxygenate compounds; and an internal combustion engine configured to initiate combustion through compression or high energy discharge, the internal combustion engine including: a fuel injection system configured to provide fuel injection, and a cooling system configured to cool the internal combustion engine, the internal combustion engine being configured to heat the oxygenate compound synthesis device using heat from the cooling system of the internal combustion engine. Applications of the devices, systems and methods are also disclosed.

18 Claims, 10 Drawing Sheets

Related U.S. Application Data

(60) Provisional application No. 61/602,425, filed on Feb. 23, 2012.

(51) Int. Cl.

| | | |
|---|---|---|
| *F02B 43/08* | (2006.01) | |
| *F02B 47/06* | (2006.01) | |
| *F02M 21/02* | (2006.01) | |
| *F02M 25/12* | (2006.01) | |
| *B01J 8/06* | (2006.01) | |
| *F02G 5/00* | (2006.01) | |
| *F02M 25/00* | (2006.01) | |
| *F02B 29/04* | (2006.01) | |

(52) U.S. Cl.
CPC ............ *F02G 5/00* (2013.01); *F02M 21/0215* (2013.01); *F02M 21/0227* (2013.01); *F02M 25/00* (2013.01); *F02M 25/12* (2013.01); *B01J 2208/00106* (2013.01); *B01J 2208/00389* (2013.01); *B01J 2208/06* (2013.01); *F02B 29/0437* (2013.01); *Y02T 10/121* (2013.01); *Y02T 10/32* (2013.01)

(58) Field of Classification Search
USPC ...... 123/568.11–568.32, 557, 536–538, 1 A, 123/3; 502/75
See application file for complete search history.

(56) References Cited

U.S. PATENT DOCUMENTS

| | | |
|---|---|---|
| 4,417,000 A | 11/1983 | Slaugh et al. |
| 4,422,412 A | 12/1983 | Norton |
| 4,605,788 A | 8/1986 | Brake |
| 5,794,601 A | 8/1998 | Pantone |
| 5,906,664 A | 5/1999 | Basu et al. |
| 6,205,957 B1 | 3/2001 | Saylor |
| 6,935,284 B2 | 8/2005 | Qian et al. |
| 7,263,967 B2 | 9/2007 | Hotta et al. |
| 7,290,505 B2 | 11/2007 | Kamio et al. |
| 7,370,609 B2 | 5/2008 | Kamio |
| 7,449,034 B1 | 11/2008 | Mikkelsen et al. |
| 7,610,896 B2 | 11/2009 | Kakuho et al. |
| 7,620,896 B2 | 11/2009 | Miller et al. |
| 7,721,703 B2 | 5/2010 | Kakuho et al. |
| 7,856,950 B2 | 12/2010 | Kuzuoka et al. |
| 7,910,630 B2 | 3/2011 | Rostrup-Nielsen et al. |
| 8,474,440 B2 | 7/2013 | Taucher |
| 8,707,934 B2 | 4/2014 | Rowley et al. |
| 2002/0159939 A1 | 10/2002 | Lieftink et al. |
| 2006/0260588 A1 | 11/2006 | Keiichiro et al. |
| 2009/0165762 A1* | 7/2009 | Fitchpatrick ........ F02D 19/0647 123/576 |
| 2011/0105306 A1 | 5/2011 | Chien et al. |
| 2012/0277330 A1 | 11/2012 | Goetsch et al. |
| 2013/0000181 A1* | 1/2013 | Janssens ................... C10L 1/02 44/302 |

OTHER PUBLICATIONS

Horstman, David, et al., "Feasibility Study of an On-Board Natural Gas to Dimethyl Ether Reactor of Dimethyl Ether Preinjection and Enhanced Ignition", Journal of Engineering for Gas Turbines and Power, vol. 127, Oct. 2005, pp. 909-917.

Shimada, Atsushi, et al., "Improvement of Thermal Efficiency Using Fuel Reforming in SI Engine", SAE International, Apr. 12, 2010, 15 pages.

* cited by examiner

OXYGENATE COMPOUND SYNTHESIS DEVICE, SYSTEMS INCLUDING THE DEVICE, AND METHODS OF USING THE SAME

CROSS-REFERENCE TO RELATED APPLICATION

This is a continuation of U.S. patent application Ser. No. 13/772,244, filed Feb. 20, 2013 which is a non-provisional application claims priority to and the benefit of U.S. Provisional Application Ser. No. 61/602,425, filed on Feb. 23, 2012 and entitled OXYGENATE COMPOUND SYNTHESIS DEVICE, SYSTEMS INCLUDING THE DEVICE, AND METHODS OF USING THE SAME, the entire contents of which are incorporated herein by reference.

FIELD

The following description relates generally to the synthesis of an oxygenate compound or a mixture of oxygenate compounds. More specifically, the following description relates to an oxygenate compound synthesis device, and systems including the device. The following description also relates to methods of synthesizing an oxygenate compound or a mixture of oxygenate compounds, such as methods of using the oxygenate compound synthesis device and/or a system including the device.

BACKGROUND

Internal Combustion Engines (ICE's) are used for generating power in a variety of applications, such as vehicles and engine generators for generating electricity. For example, ICE's are used for generating power in vehicles such as automobiles, trucks, trains, armored vehicles, tractors, boats, submarines, and aircraft. Research is continually being conducted to improve ICE efficiency. ICE researchers, designers and manufacturers seek to balance efficiency gains with resulting emissions, as more stringent emissions standards are being implemented throughout the world.

In general, there are two broad types of ICE's that differ by the combustion initiating source, for example, spark-ignition or compression ignition. Spark-ignited engines rely on a high energy discharge to ignite the fuel with the air present in the combustion chamber of the engine. The fuel used with spark-ignited engines typically has ignition characteristics that require high temperatures to initiate the ignition. For example, spark-ignited engines often use fuels such as gasoline, natural gas and/or ethanol, which all have poor autoignition characteristics (e.g., relatively higher octane numbers than fuels used for compression ignition).

Alternatively, a compression ignition engine (e.g., a diesel engine) is an internal combustion engine that uses the heat of compression to initiate ignition to burn fuel that has been injected into the combustion chamber. This is in contrast to spark-ignition engines which use a spark plug to provide a high energy discharge to ignite an air-fuel mixture. Compression ignition engines, rely on the fuel to ignite within the operating conditions of the engine. There are a number of fuels that are suitable for compression ignition engines such as, but not limited to, diesel fuel and some modern "biofuels."

The two main types of ICE's (e.g., spark-ignition and compression ignition) differ in other characteristics as well. For example, spark-ignition engines and compression ignition engines typically operate using different compression ratios. One feature of compression ignition engines is that they have better optimized engine compression ratios (e.g., higher compression ratios) that lead to higher engine efficiencies. Spark-ignited engines on the other hand, tend to have lower compression ratios in an effort to limit autoignition of the fuel during operation. Compression ignition engines are typically more efficient than spark-ignited engines as a result of the higher compression ratios employed by compression ignition engines.

Additionally, emissions concerns vary for both types of ICE's. Compression ignition engines using diesel fuel tend to have greater concerns with the emission of particulate matter and nitrous oxides (due to the high combustion temperatures often obtained). Spark-ignited engines using, for example, gasoline fuel, often have concerns regarding the emission of unburnt hydrocarbon compounds, which may include a variety of hydrocarbon compounds, and carbon monoxide. As such, the concerns regarding emissions are often linked to the fuel being used. Consequently, understanding how engines obtain enhanced efficiencies and lower emissions can lead to improvements in engine operation obtained by fuel optimization.

Currently, dual- or bi-fuel systems are being used with compression ignition engines to enable clean and efficient combustion. The particular fuel composition of the dual- or bi-fuel system may depend upon the operating condition of the engine with which it is being used. For example, under high load conditions engines have high in-cylinder temperatures and compression ignition is easier to achieve. Thus, under high load conditions, the dual- or bi-fuel composition may be formulated to be less susceptible to compression ignition (e.g., it may be formulated to be compressed further than other formulations of the fuel of the dual- or bi-fuel before ignition will occur) may be used.

In contrast, in-cylinder temperatures are much lower under low load conditions and, therefore, compression ignition is more difficult to achieve. Although in-cylinder temperatures remain low under low load conditions, for compression ignition engines the fuel still needs to be able to ignite as a result of compression. As such, a dual-fuel system typically uses one fuel to allow compression ignition under low, hard to ignite, engine load conditions, and a different fuel under the high, relatively easier to ignite, engine load conditions.

An example of a dual-fuel system being used with a compression ignition engine may currently be found in the area of generators. For example, some dual-fuel generators use a combination of diesel fuel and natural gas. Due to its relatively lower price and cleaner combustion characteristics, natural gas is used as the bulk fuel component, while the diesel fuel is used primarily as a 'pilot' or ignition source when compression ignition is more difficult to achieve. These types of systems are costly and not preferred due to the need for two fuel sources.

SUMMARY

Aspects of embodiments of the present invention are generally directed to the synthesis of an oxygenate compound or a mixture of oxygenate compounds. For example, embodiments of the invention include an oxygenate compound synthesis device, and systems (e.g., fuel systems and engine systems) including the device. The oxygenate compound or mixture of oxygenate compounds may be used as a fuel for an engine, such as an ICE. Embodiments of the invention are also directed to methods of using the oxygenate compound synthesis device and methods of using a system including the oxygenate compound synthesis device. Using the oxygenate compound or mixture of oxygenate compounds as a fuel for an engine may enable the engine to run more efficiently and/or with lower emissions.

Aspects of embodiments of the present invention are directed to an oxygenate compound synthesis device for an engine fuel system, the oxygenate compound synthesis device including: a reactor including a catalyst, wherein the oxygenate compound synthesis device is configured to convert at least a portion of a feedstock to an oxygenate compound or a mixture of oxygenate compounds.

According to an embodiment of the invention, an internal combustion engine system includes a fuel system including an oxygenate compound synthesis device including a reactor including a catalyst, the oxygenate compound synthesis device being configured to convert at least a portion of a feedstock to an oxygenate compound or a mixture of oxygenate compounds; and an internal combustion engine configured to initiate combustion through compression or high energy discharge, the internal combustion engine including: a fuel injection system configured to provide the oxygenate compound or mixture of oxygenate compounds to a combustion chamber of the internal combustion engine, and a cooling system configured to cool the internal combustion engine, the internal combustion engine being configured to heat the oxygenate compound synthesis device using heat from the cooling system of the internal combustion engine.

The reactor may be a plug flow reactor (PFR) including an elongated tube, and the catalyst is located inside the elongated tube.

The reactor may be a shell and tube heat exchanger comprising a shell surrounding a plurality of elongated reactor tubes, and the catalyst is located inside the elongated reactor tubes.

The catalyst may be a partial oxidation catalyst. For example, the partial oxidation catalyst may be of the type used for alcohol synthesis, such as those used for methanol and higher alcohol synthesis.

The partial oxidation catalyst may be one or more of zinc, chromium, copper, platinum, palladium, cobalt, iron, rhodium, cerium, molybdenum, oxides thereof, and mixtures thereof. The partial oxidation catalyst may further include carbon, silicon, sulfur, selenium, or mixtures thereof.

The partial oxidation catalyst may be supported on a support including alumina, chromium oxide, silicon carbide, silica, zirconia, titania, or combinations thereof.

The oxygenate compound synthesis device may further include an acidic catalyst. The acidic catalyst may include a zeolite. For example, the acidic catalyst may include ferrierite, ZSM-5 and zeolite beta. The acidic catalyst may be treated with a nitrogen-containing base, such as, for example, n-butyl amine and ammonia.

The feedstock may be syngas. The feedstock may be produced from a hydrocarbon source, such as, for example, natural gas, diesel fuel, biomass, ethanol or the like.

The oxygenate compound or mixture of oxygenate compounds may be alcohol, ether, aldehyde, or mixtures thereof.

The oxygenate compound may include dimethyl ether, diethyl ether, higher linear ethers (e.g., ethers having a carbon backbone having 3 or more carbon atoms in the carbon backbone, such as ethers having a carbon backbone having 3 to 8 carbon atoms in the carbon backbone), and/or branched ethers (e.g., diisopentyl ether). For example, the branched ethers may have 4 or more carbon atoms in the carbon backbone (e.g., 4 to 13 carbon atoms in the carbon backbone).

The oxygenate compound synthesis device may be configured to provide an oxygenate fuel composition comprising the oxygenate compound or the mixture of oxygenate compounds, the oxygenate compound or mixture of oxygenate compounds being present in the oxygenate fuel composition in an amount in a range of about 1 to about 50 vol % based on the total volume of the oxygenate fuel composition.

Embodiments of the invention are also directed to a fuel system for an engine including: an oxygenate compound synthesis device in fluid communication with a feedstock supplier and configured to be in fluid communication with a fuel injection system of an internal combustion engine; wherein the oxygenate compound synthesis device is configured to receive a feedstock from the feedstock supplier, wherein the oxygenate compound synthesis device is configured to convert at least a portion of the feedstock to an oxygenate compound or a mixture of oxygenate compounds, and wherein the oxygenate compound synthesis device is configured to provide an oxygenate fuel composition including the oxygenate compound or mixture of oxygenate compounds to the fuel injection system.

The oxygenate compound synthesis device may include a reactor configured to be heated using heat from the exhaust gas of the internal combustion engine, the effluent produced by the oxygenate compound synthesis device, an electrical heater, combustion of the feedstock, and/or cooling system of the internal combustion engine (e.g., an engine radiator).

The feedstock may be syngas.

The oxygenate synthesis device may be configured to vary composition of the oxygenate fuel composition according to the load conditions of the internal combustion engine.

The oxygenate fuel composition may be configured to be combustible over a range of engine load conditions.

The fuel system may further include a feedstock pump between the feedstock supplier and the oxygenate compound synthesis device, wherein the feedstock pump is configured to maintain a feedstock pressure at the oxygenate compound synthesis device.

The syngas may include a mixture of carbon monoxide, carbon dioxide and hydrogen. The carbon monoxide, carbon dioxide and hydrogen can be included in the syngas in various amounts depending upon the composition of the hydrocarbon source and method of reforming the hydrocarbon (e.g., steam or autothermal reforming).

The oxygenate compound synthesis device may include a partial oxidation catalyst and an acidic catalyst.

The oxygenate compound or mixture of oxygenate compounds may be present in the oxygenate fuel composition in an amount in a range of about 1 to about 50 vol % based on the total volume of the oxygenate fuel composition.

Embodiments of the invention are also directed to a method of synthesizing an oxygenate compound or mixture of oxygenate compounds, the method including: reacting a feedstock in an oxygenate synthesis device in the presence of a partial oxidation catalyst and an acidic catalyst to form the oxygenate compound or mixture of oxygenate compounds; and directing the oxygenate compound or mixture of oxygenate compounds to an internal combustion engine.

Still other embodiments of the invention are directed to a method of providing an oxygenate compound or mixture of oxygenate compounds to an internal combustion engine, the method including: providing a feedstock to an oxygenate synthesis device; reacting the feedstock in the presence of a partial oxidation catalyst and an acidic catalyst to form the oxygenate compound or mixture of oxygenate compounds;

and providing the oxygenate compound or mixture of oxygenate compounds to an internal combustion engine.

The oxygenate compound synthesis device may be configured to provide an oxygenate fuel composition including the oxygenate compound or the mixture of oxygenate compounds in an amount in a range of about 1 to about 50 vol % based on the total volume of the oxygenate fuel composition.

The feedstock may be syngas.

The oxygenate compound or mixture of oxygenate compounds may include dimethyl ether, diethyl ether, linear ethers having a carbon backbone having 3 or more carbon atoms in the backbone, such as ethers having a carbon backbone having 3 to 8 carbon atoms in the carbon backbone), branched ethers, and/or other ethers. For example, the branched ethers may have 4 or more carbon atoms in the carbon backbone (e.g., 4 to 13 carbon atoms in the carbon backbone).

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

Figure 1:
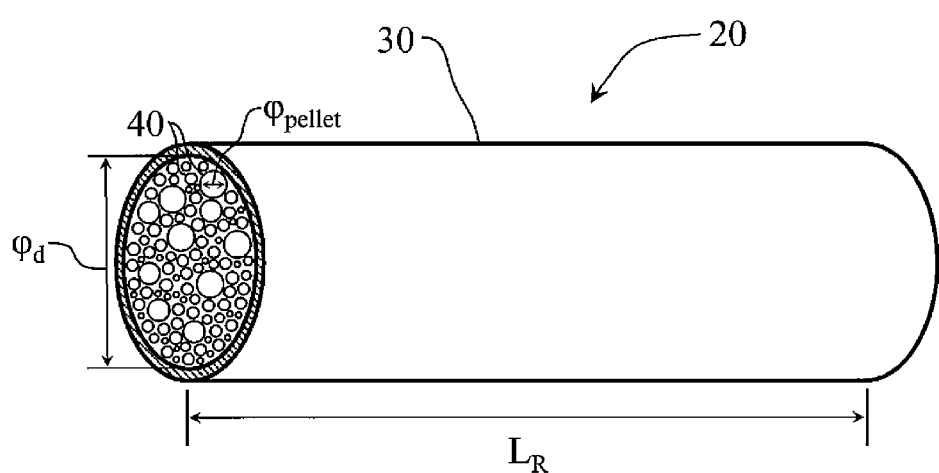
FIG. 1 is a schematic side perspective view of an oxygenate synthesis device according to an embodiment of the present invention.

In the following detailed description, only certain embodiments of the present invention are shown and described, by way of illustration. As those skilled in the art would recognize, the invention may be embodied in many different forms and should not be construed as being limited to the embodiments set forth herein. It will be appreciated that the device, methods, and applications of the invention can include any of the features described herein, either alone or in combination.

Aspects of embodiments of the present invention are directed to a device, method and application relating to a single fuel source, which enables efficient operation of a compression or spark ignition engine throughout the entire operational drive cycle of a compression or spark ignition engine. Further, a fuel system with multiple fuel options and having the ability to optimize the composition stoichiometry of the fuel delivered to the engine is desirable.

For example, aspects of embodiments of the present invention are generally directed to the synthesis of an oxygenate compound or a mixture of oxygenate compounds. Embodiments of the invention include an oxygenate compound synthesis device, and systems (e.g., fuel systems and engine systems) including the device. Embodiments of the invention are also directed to methods of using the oxygenate compound synthesis device and methods of using a system including the oxygenate compound synthesis device. Using the oxygenate compound or mixture of oxygenate compounds as a fuel for an engine may enable the engine to run more efficiently and/or with lower emissions.

For example, embodiments of the present invention are directed to devices, systems and methods for synthesizing an oxygenate compound, such as, for example, dimethyl ether (DME), or a mixture of oxygenate compounds from a fuel or feedstock, such as, for example, syngas. DME is a fuel that readily autoignites within the operating conditions of a compression ignition engine and, therefore, under the operating conditions of a compression or spark ignition engine, DME has desirable ignition characteristics. Accordingly, the oxygenate compound or mixture of oxygenate compounds may be used as a fuel for an engine, such as a compression ignition engine, to provide efficiencies comparable to those obtained using diesel fuels. Alternatively, the oxygenate compound may be used as a fuel for a spark ignition engine to provide emission reductions. By producing an oxygenate compound or a mixture of oxygenate compounds from a fuel or feedstock, embodiments of the present invention can provide high efficiencies and/or emissions reductions from a single fuel or feedstock, such as, for example, syngas. Thus, an engine system including an oxygenate synthesis device can achieve good efficiency (e.g., efficiency that is as good or better than the efficiency obtained using diesel fuel) using a single fuel or feedstock, such as syngas, which has a lower cost than typical compression ignition fuels, such as diesel fuel or dual- or bi-fuel compositions.

As used herein, the term "syngas" refers to a mixture of varying amounts of hydrogen and carbon monoxide produced from various hydrocarbon sources. Syngas primarily includes hydrogen and carbon monoxide, but various amounts of carbon dioxide may be present as well. For example, hydrogen, carbon monoxide and carbon dioxide may be present in syngas in varying amounts depending upon the hydrocarbon source from which the syngas was produced and the method of production. The stoichiometry or ratio of the hydrogen to carbon monoxide can be influenced by the physical and chemical conditions under which the syngas was synthesized. Other components that may be present in the syngas include, but are not limited to, nitrogen, helium and argon.

Syngas can be produced through various methods of production including, but not limited to, steam, carbon dioxide or autothermal reforming of hydrocarbons, partial oxidation of hydrocarbons, gasification of coal, gasification of biomass and other waste-to-energy gasification processes.

Reforming typically involves a source of oxygen. For example, steam reforming relies upon oxygen present in the steam. Syngas may be prepared from biomass or other waste, natural gas, diesel, gasoline, other fractions of crude oil, and alcohols.

FIG. 1 is a schematic side perspective view of an oxygenate compound synthesis device 20 according to an exemplary embodiment of the invention. In this embodiment, the oxygenate synthesis device 20 includes a reactor 30 and a catalyst 40. The reactor 30 may be of a plug flow type in nature. For example, as shown in FIG. 1, the reactor 30 may include an elongated tube, and the catalyst 40 may be positioned inside the elongated tube. As shown in FIG. 1, the elongated tube of the reactor 30 may have a diameter $\phi_d$. In some embodiments, the diameter $\phi_d$ is in a range of about 1 cm to about 45 cm (e.g., in a range of about 1 cm to about 30 cm). A length $L_R$ of the elongated tube may be in a range of about 10 cm to about 300 cm, e.g., in a range of 10 cm to 200 cm.

In one embodiment, the catalyst 40 is a partial oxidation catalyst. The catalyst 40 may further include an acidic catalyst. For example, the catalyst 40 may be a bifunctional or hybrid catalyst, including both a partial oxidation component (e.g., a partial oxidation catalyst) and an acidic component (e.g., an acidic catalyst). The catalyst may be in the form of a solid, liquid, or a pseudo solid/liquid, wherein the solid may be pellets, powder or a catalyst coated substrate, depending on the mode of operation of the device. For example, when the reactor is configured to have a high fluid velocity, a coated substrate may be used to minimize pressure drop through the system and allow for suitable diffusion into the catalyst. In other embodiments, if a small engine is being utilized, a smaller reactor containing pellets of catalyst may be used, which may provide suitable diffusion into the pellets at the fluid velocities of the system.

As shown in FIG. 1, the catalyst 40 may be present as particles or pellets having a diameter $\phi_{pellet}$. In some embodiments, the diameter $\phi_{pellet}$ is in a range of about 0.6 mm to about 2.0 mm. The catalyst may be any suitable catalyst, such as an industrial dimethyl ether synthesis catalyst. The partial oxidation component may include a methanol synthesis catalyst. For example, the partial oxidation component may include, but is not limited to: a mixture of copper and zinc supported on alumina; copper oxide and zinc oxide supported on alumina; zinc oxide supported on chromium (III) oxide; or various copper manganese oxides supported on gamma-alumina. In certain embodiments, the alumina is a high surface area alumina, such as, but not limited to mesoporous alumina. The partial oxidation catalyst may be a metal oxide catalyst selected for its ability to oxidize carbon and/or hydrogen bonds (e.g., to oxidize the carbon and/or hydrogen atoms of various compounds).

Any of the catalysts described herein may be supported on any suitable support. For example, the above-identified supports may further include or may be substituted with a variety of suitable supports, such as, but not limited to, silicon carbide, silica, zirconia, titania or larger surface area mesoporous materials. The reactor may include a catalyst support or substrate such as those typically used in engine catalytic converters. For example, the catalyst support or substrate may include a monolithic or foam substrate composed of silicon carbide, alumina, zeolite, cordierite, mullite, nickel, copper, aluminum, stainless steel (316, 304), or inconel (600, 617, 625, 718, X-750). The catalyst support or substrate may be contained within a heat exchanging device (e.g., the reactor 30) and the catalyst support or substrate may be directly heated by applying an electrical current across the heat exchanging device.

The reactor may be a micro channel reactor such as those having rectangular, square, or cylindrical channels as reaction and heat exchange paths. When the channels are rectangular or square channels, the channels may have a width and/or height in a range of 0.02 to 10 mm. When the channels are cylindrical channels, the channels may have a diameter in a range of 0.02 to 10 mm. The dimensions of the channels may be varied in consideration of heat exchange and/or catalyst-reactant interaction. The size and number of channels in a micro channel reactor may be selected based on the fluid velocity within the channels, the rate of diffusion of reactants with respect to the catalyst, and the heat transfer properties. The micro channel reactor may have any suitable design, for example, a design similar to that shown in FIG. 2.

The partial oxidation component (e.g., partial oxidation catalyst) may also include an additional metal oxide. For example, the partial oxidation component may include a Cu—MnO-MO (M=Zn, Cr, W, Mo, Fe, Co, and/or Ni) catalyst on a support (e.g., $\gamma$-$Al_2O_3$). In some embodiments, the partial oxidation component includes Cu-MO/$\gamma$-$Al_2O_3$ (M=Mn, Zn, Cr, W, Mo, Fe, Co, and/or Ni), the Cu being included in an amount in a range of about 50 percent to about 95 percent, and the MO being included in an amount in a range of about 5 percent to about 50 percent based on the total weight of the Cu-MO.

In certain embodiments, the partial oxidation component includes $CeO_2$. In other embodiments, the partial oxidation component may include MgO. When the partial oxidation component includes MgO, the partial oxidation component may promote alcohol coupling.

In certain embodiments, the acidic component includes a solid acid catalyst, such as, but not limited to, H-ZSM-5, zeolite beta (e.g., H-Beta), ferrierite or H-SAPO-34 catalysts. In other embodiments, the acidic catalyst includes alumina (e.g., $\gamma$-alumina), modified aluminas (e.g., halide treated alumina), silica-alumina, metal-modified zeolites (e.g., sodium modified ZSM-5), metal substituted zeolites (e.g., boron incorporated ZSM-5), silicoaluminum phosphates (e.g., SAPO-34), modified silicoaluminum phosphates (e.g., cobalt doped SAPO-34), aluminum phosphates (e.g., ALPO-18), modified aluminum phosphates (e.g., cobalt incorporated ALPO-18), acidic mesoporous materials (e.g., Si-MCM-41), ion exchange resins (e.g., NAFION®; NAFION is a registered trademark of E.I. DuPont de Nemours & Co.), polysulfonated resins (e.g., AMBERLYST® 15; AMBERLYST® is a registered trademark of Rohm and Hass Co.), solid phosphoric acid, supported mineral acids (e.g., boric acid on diatomaceous earth), heteropoly acids (e.g., silicotungstic acid), supported heteropoly acids (e.g., silicotungstic acid on SBA-15), sulfonated zirconia, metal oxides, mixed metal oxides (e.g., titanium dioxide-zirconium dioxide), and/or supported acids (e.g., antimony pentafluoride on silica-alumina, pillared interlayered clays, or combinations thereof). The acidic component may be in the form of pellets, powder, liquid, pseudo-liquid or coated substrate.

In certain embodiments, the partial oxidation component and the acidic component are present as a mixture. The ratio of the partial oxidation component to the acidic component may be in a range of about 10:1 to about 1:10. For example, the ratio of the partial oxidation component to the acidic component may be 1:1.

In certain embodiments, the oxygenate compound synthesis device further includes a second partial oxidation catalyst. For example, the second partial oxidation catalyst may include vanadium pentoxide and/or silver supported on alumina. In certain embodiments, the second partial oxidation results in the formation of additional aldehydes. For example, the second partial oxidation catalyst may convert alcohols, often alcohols including 2 carbon atoms or more in chain length, produced by the first partial oxidation catalyst into aldehydes. The resultant aldehydes typically have more favorable ignition characteristics as compared to the alcohols from which they were derived. For example, a catalyst such as silver oxide supported on alumina, a vanadium-phosphorus-oxide (VPO) catalyst or an alumina supported precious metal such as Rhodium made be used.

Figure 2:
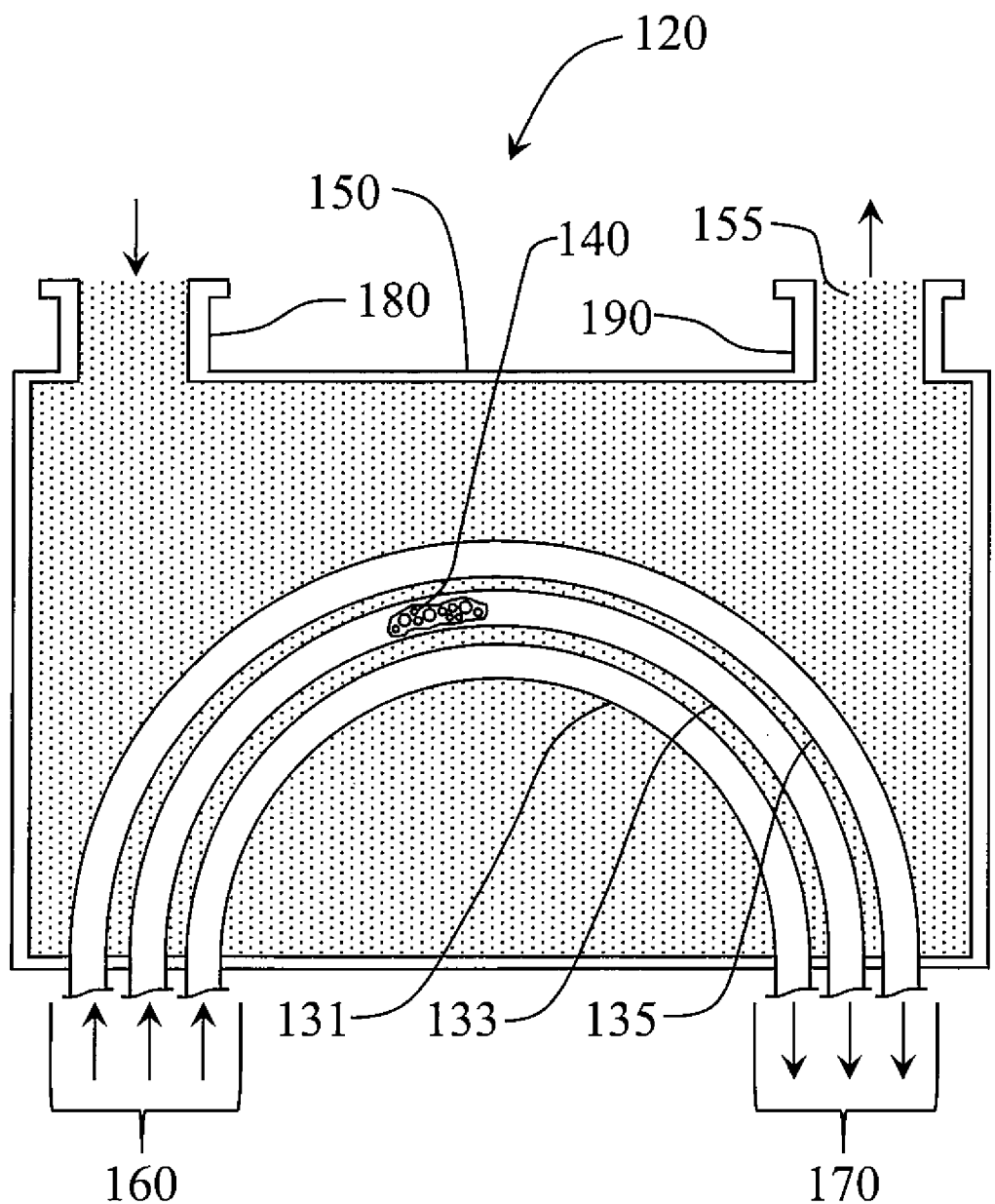
FIG. 2 is a schematic partial cutaway cross-sectional view of an oxygenate synthesis device including a micro channel reactor according to an embodiment of the invention.

In some embodiments, the oxygenate synthesis device includes a reactor that is a shell and tube heat exchanger. For example, FIG. 2 is a schematic partial cutaway view of an exemplary embodiment of an oxygenate synthesis device in the form of a shell and tube heat exchanger. As can be seen in FIG. 2, the oxygenate synthesis device 120 includes reactors 131, 133 and 135 (e.g., micro channel reactors), which include a plurality of elongated tubes. In FIG. 2, the reactors 131, 133, and 135 the reactors are hemispherical (or U-shaped) tubes. However, the present invention is not limited thereto, and the reactors 131, 133 and 135 may have any suitable shape and may be located in any suitable arrangement. In the embodiment shown in FIG. 2, the reactors 131, 133 and 135 is in a shell 150, and the catalyst 140 is located inside the elongated tubes of the reactors 131, 133 and 135. The catalyst and other features in this embodiment, and the subsequent embodiments, are the same or substantially the same as in the previous embodiments, and therefore, further description of these features will be omitted here.

In this embodiment, the oxygenate synthesis device 120 may be configured to include a heat exchange fluid 155 in the shell 150 and at least partially surrounding the reactors 131, 133, and 135. The heat exchange fluid 155 may be any suitable heat exchange fluid, such as, for example, water or aqueous solutions (e.g., aqueous solutions including ethylene glycol), and it may be a gel, liquid or gas. Such heat exchange fluids are well known in the art, and further description thereof will be omitted.

The oxygenate synthesis device 120 also includes a fuel or feedstock inlet 160, a reactor effluent outlet 170, a heat exchange fluid inlet 180, and a heat exchange fluid outlet 190. The fuel or feedstock (e.g., syngas) enters the reactors 131, 133 and 135 through the fuel or feedstock inlet 160. The oxygenate compound or mixture of oxygenate compounds are included in the reactor effluent, which exits the reactors 131, 133 and 135 through the reactor effluent outlet 170. The heat exchange fluid 155 enters the oxygenate synthesis device 120 through the heat exchange fluid inlet 180. The heat exchange fluid exits the oxygenate synthesis device 120 through the heat exchange fluid outlet 190. The shell 150 and/or the reactors 131, 133 and 135 may include baffles, which promote heat exchange.

The oxygenate synthesis device 120, which includes a shell and tube reactor, allows for heating or cooling of the reactors 131, 133 and 135 (e.g., by way of heat exchange). The oxygenate synthesis device 120 is configured to provide effective catalytic conversion of syngas, or other suitable fuels, to an oxygenate rich stream (e.g., an effluent including an oxygenate compound or a mixture of oxygenate compounds), which is typically an exothermic reaction. Accordingly, the oxygenate synthesis 120 device may benefit from suitable heat exchange, such as, but not limited to, heating before or during startup, and cooling (e.g., maintaining a steady temperature) during operation. For example, controlling thermal runaway may be important during operation. Often, in large-scale industrial catalytic reactors, Slurry Phase Reactors are used with stirring to control reaction temperature. Here, in this embodiment, the oxygenate synthesis device 120 instead controls the temperature by way of the simpler shell and tube reactor, which provides precise control of the delivery of the heat exchange fluid into the shell side of the reactor.

As an example, energy or heat for the synthesis of the oxygenate compound or mixture of oxygenate compounds may be provided by way of heat exchange or an auxiliary heater. The heat may be provided prior to the synthesis of the oxygenate compound or mixture of oxygenate compounds (e.g., by pre-heating the fuel or feedstock). Alternatively, the heat may be provided during the synthesis. In still other embodiments, the heat is provided both prior to the synthesis and during the synthesis.

Additionally, heat exchange may remove heat from the reactors 131, 133 and 135. For example, heat may be provided to the reactors 131, 133 and 135 before and/or during startup, and then, heat may be removed from the reactors 131, 133 and 135 during operation of the oxygenate synthesis device 120.

Energy or heat for the synthesis of the oxygenate compound or mixture of oxygenate compounds may be provided by one or more of the following: exhaust gases from an engine (e.g., an internal combustion engine), the effluent produced by the oxygenate compound synthesis device, coolant from the engine, an electrical heater (e.g., electrical heating using electricity from the engine alternator system or another power supply), and direct combustion and/or oxidation of the fuel or feedstock (e.g., the syngas), but the present invention is not limited thereto. Additionally, or alternatively, energy or heat produced by the synthesis of the oxygenate compound or mixture of oxygenate compounds may be absorbed by one or more of the following: reactor coolant, outside air, exhaust gases from the engine, the effluent produced by the oxygenate compound synthesis device, and coolant from the engine, but the present invention is not limited thereto.

The foregoing heat exchange may be accomplished by way of the above described shell and tube reactor. Additionally, a pump, thermocouple and control scheme or control system may participate in the heat exchange. When heat from the engine coolant is used for the synthesis of the oxygenate compound or mixture of oxygenate compounds, it may be beneficial if the engine coolant has a temperature of about 90° C. or higher.

Embodiments of the invention may also maintain the temperature of the effluent from the oxygenate compound synthesis device. The temperature of the effluent may be maintained by a heat exchanger, which may be the same as or different from the above-described heat exchanger. For example, the effluent temperature may be maintained by way of heat exchange with the engine air intake, syngas input and/or engine coolant, to add heat to, or, alternatively, remove heat from the effluent. In certain embodiments, a pump system may participate in the heat exchange, but such a pump system may not be necessary.

In view of the above-described heat exchange, the reactors according to any of the previous embodiments may include an elongated tube or a plurality of elongated tubes having a size or sizes selected in view of activity of the catalyst. In certain embodiments of the present invention, small size pellets of catalyst, such as, but not limited to, pellets having an average diameter of ~1-2 mm, are used. In certain embodiments, the diameter of the reactor tube (e.g., the elongated tube or plurality of elongated tubes) is chosen to be approximately 5 times the diameter of the catalyst pellets. Additionally, a ratio of the length $L_R$ to diameter $\phi_d$ may be chosen to be greater than 15:1 (e.g., L/D>15). The reactor shell may be formed of any suitable material, such as, for example, titanium or stainless steel, but the invention is not limited thereto. For example, the material of the reactor shell may include titanium, SS 316, SS 304, INCONEL® (INCONEL is a registered trademark of Special Metals Corporation), HASTELLOY® (HASTELLOY is a registered trademark of Haynes International, Inc.), or any other suitable material.

Figure 3:
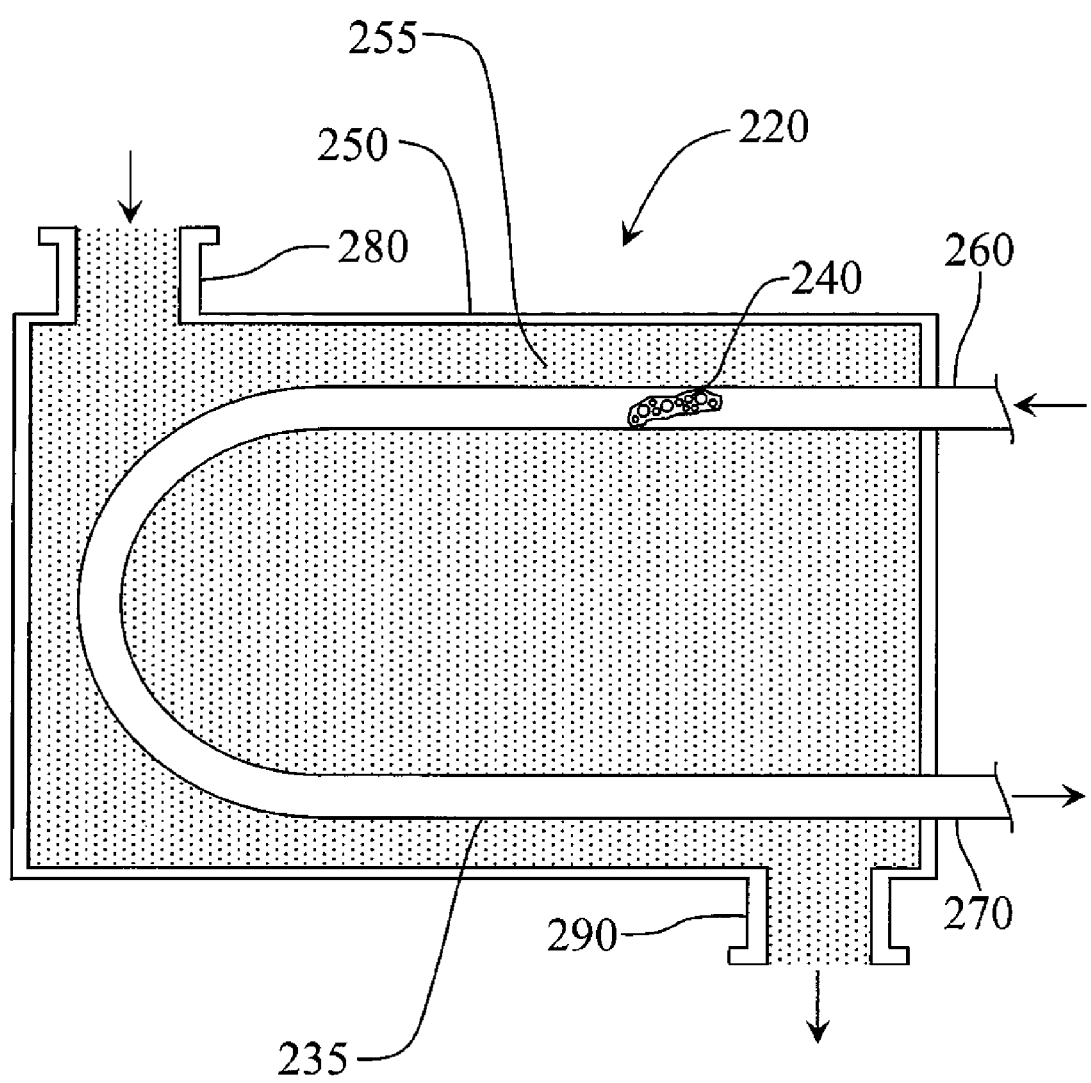
FIG. 3 is a schematic partial cutaway cross-sectional view of an oxygenate synthesis device according to an embodiment of the invention.

The present invention is not limited to the above described oxygenate synthesis devices. For example, FIG. 3 is a schematic partial cutaway view of an oxygenate synthesis device according to another embodiment of the present invention. In the embodiment shown in FIG. 3, an oxygenate synthesis device 220 includes a reactor 235 including a catalyst 240. The oxygenate synthesis device is configured to include heat exchange fluid 255 in a shell 250 and at least partially surrounding the reactor 235.

The oxygenate synthesis device also includes a fuel or feedstock inlet 260, a reactor effluent 270, a heat exchange fluid inlet 280 and a heat exchange fluid outlet 290. The fuel or feedstock (e.g., syngas) enters the reactor 235 through the fuel or feedstock inlet 260. The oxygenate compound or mixture of oxygenate compounds are included in the reactor effluent, which exits the reactor 235 through the reactor effluent outlet 270. The heat exchange fluid 255 enters the oxygenate synthesis device 220 through the heat exchange fluid inlet 280. The heat exchange fluid exits the oxygenate synthesis device 220 through the heat exchange fluid outlet 290. The shell 250 and/or the reactor 235 may include baffles, which promote heat exchange. The catalyst and other features in this embodiment, and the subsequent embodiments, are the same or substantially the same as in the previous embodiments, and therefore, further description of these features will be omitted here.

Embodiments of the invention are also directed to a system, such as, for example, a fuel system or engine system that includes an oxygenate synthesis device. In these embodiments, the oxygenate synthesis device is the same or substantially the same as the oxygenate synthesis device described in connection with the previous embodiments, and therefore, description of the redundant features of the oxygenate synthesis device will be omitted.

Figure 4:
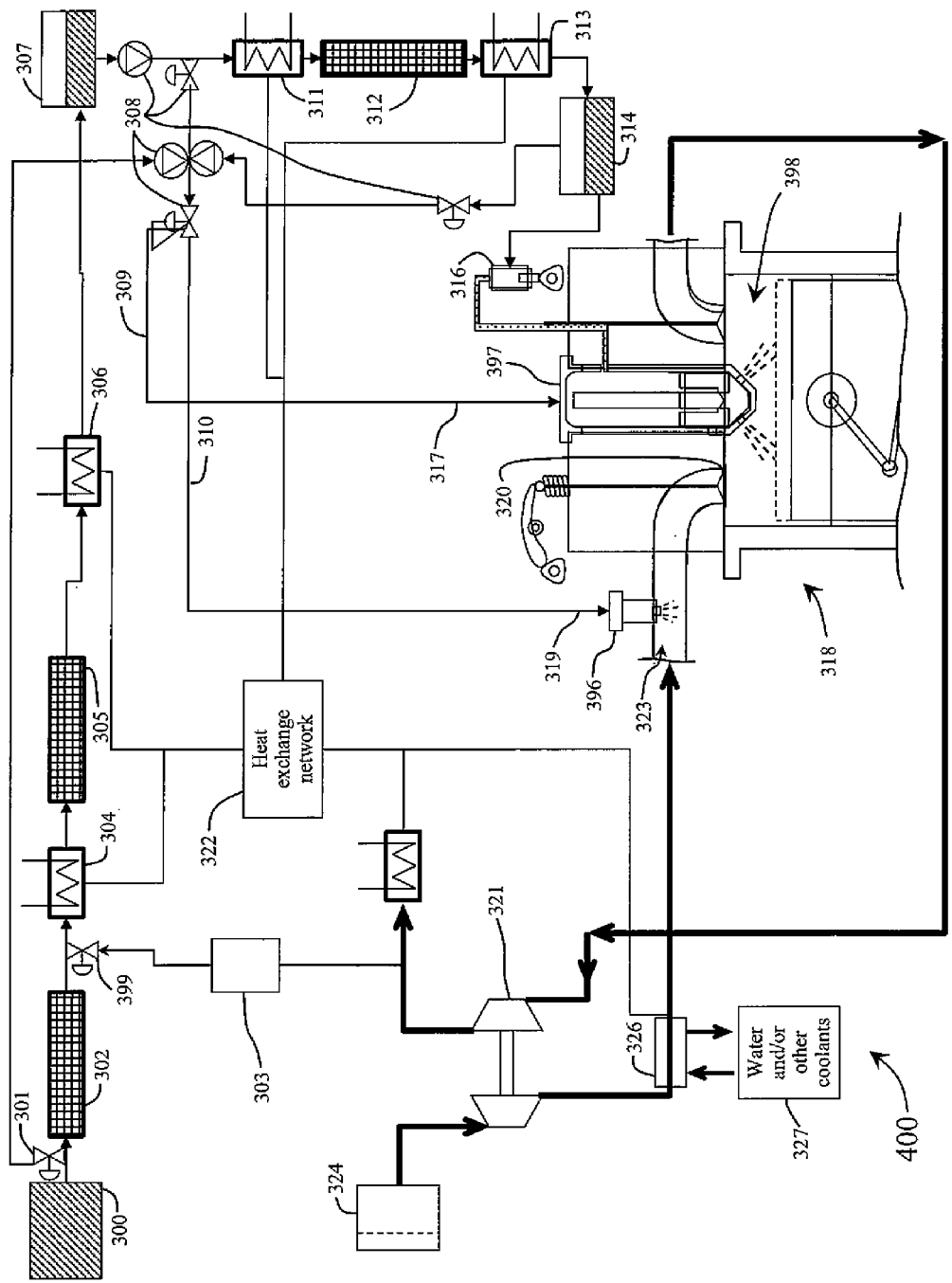
FIG. 4 is a schematic view of a fuel system and engine including an oxygenate synthesis device according to an embodiment of the invention.

FIG. 4 is a schematic view of an engine system 400 according to an exemplary embodiment of the invention. The system 400 includes an oxygenate synthesis device 312, which may be the same or substantially the same as the oxygenate synthesis devices described in the previous embodiments and, therefore, further description thereof will be omitted here. The engine system 400 also includes additional components in fluid and heat exchange communication with the oxygenate synthesis device 312. A hydrocarbon source 300 provides a hydrocarbon to the system. For example, the hydrocarbon may include any suitable hydrocarbon, such as crude oil products (such as JP-8, diesel, and gasoline), alcohols, bio-renewables, coal, biomass, biocrude, natural gas, and syngas, but the present invention is not limited thereto.

The hydrocarbon source 300 is in fluid communication with the oxygenate synthesis device 312 and with a fuel injection system (described below) to provide direct and/or indirect delivery of the hydrocarbon or an effluent of the oxygenate synthesis device to an engine 318. The hydrocarbon source 300 is in fluid communication with a bypass valve 301 that can direct the hydrocarbon to the engine 318 through a valve system 308 (e.g., two or more valves) without first passing the hydrocarbon through the oxygenate synthesis device 312. For example, in the embodiment shown in FIG. 4, the hydrocarbon can be provided from the hydrocarbon source 300 to a low pressure indirect injection path 319 through the valve system 308. A pump or pressure maintaining device may assist in the delivery of the hydrocarbon.

In certain embodiments, the hydrocarbon may need to be modified or cleaned to remove contaminants or other compounds prior to being used in the oxygenate compound synthesis device 312. For example, $H_2S$ and/or other odorants may be removed. In the embodiment shown in FIG. 4, the hydrocarbon exits the hydrocarbon source 300 and passes through a sulfur removal device 302. When removing contaminants (e.g., sulfur containing compounds) or other compounds, a two-stage approach may be used. Replaceable devices for removing contaminants or other undesirable compounds are generally known in the art. For example, the removal of contaminants and other compounds from hydrocarbons (e.g., syngas) is described in U.S. 2002/0159939, the entire contents of which are incorporated by reference herein.

In the engine system 400, the hydrocarbon may be mixed with other reactants. For example, the engine system 400 may further include a mixing system 303 configured to mix air (e.g., fresh air), exhaust gas, water, oxygen, carbon dioxide or combinations thereof with the hydrocarbon according to the method of reforming. The mixing system 303 and hydrocarbon source 300 are in direct fluid communication with a heat exchange device 304 and a reforming device 305 through a valve 399. The heat exchange device 304 may use heat energy from oxidation of the hydrocarbon from the hydrocarbon source 300 or the heat exchange device 304 may use other heat energy from the engine system 400 such as electrical energy and/or heat recovery from the exhaust, engine coolant and/or other components of the engine system 400 via a heat exchange network 322.

The reforming device 305 is a chemical reactor and may be configured to perform steam reforming, dry (carbon dioxide) reforming, autothermal reforming, partial oxidation reforming and/or combinations thereof. The reforming device 305 can be a plug flow reactor containing pellets, a reactor including a substrate coated with a catalyst (e.g., a metallic substrate, a ceramic substrate such as Cordierite, a metallic foam such as nickel foam, and/or a ceramic foam such as silicon carbide) and/or a micro-channel reactor including catalyst applied as a thin layer to a metal or ceramic structure having relatively smaller pathways for reactants (e.g., relatively smaller than the reactant pathways of a plug flow reactor) and being in close proximity to the heat exchange network. The reforming device may be configured to convert the hydrocarbon to a feedstock (e.g., syngas).

Figure 5:
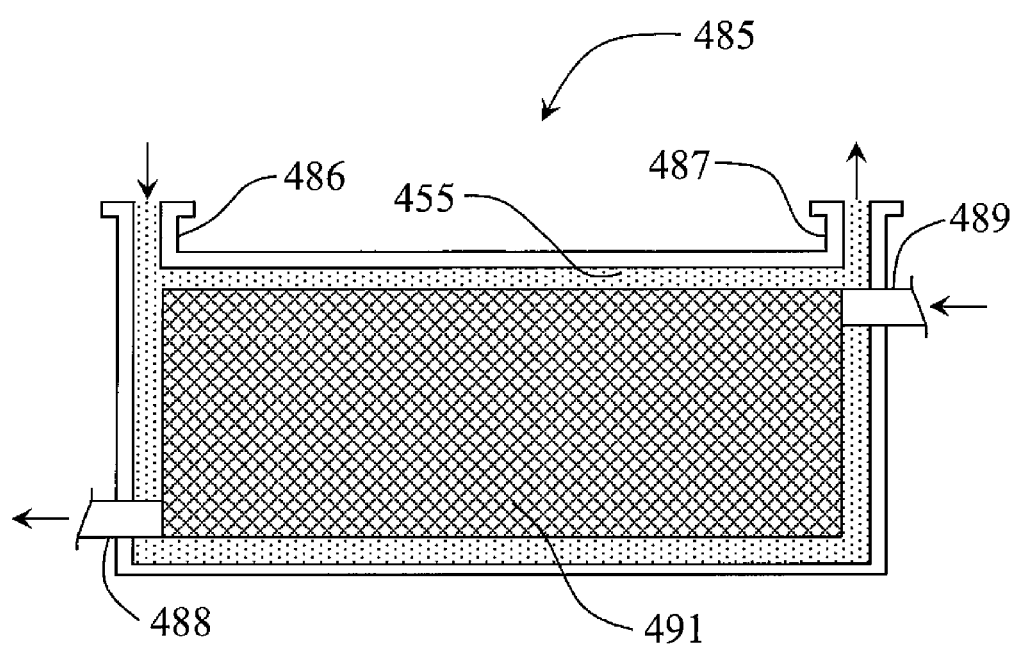
FIG. 5 is a schematic cross-sectional view of an embodiment of a recuperative heat exchanger having countercurrent flow according to an embodiment of the invention.

The reforming device 305 is in direct fluid communication with a recuperative heat exchanger 306. One embodiment of a recuperative heat exchanger is shown in FIG. 5. The recuperative heat exchanger 306 may be configured to cool the effluent syngas produced by the reforming device and to capture heat energy from the effluent syngas and provide the heat energy to the heat exchange network 322. Feedstock (e.g., syngas) produced by the reforming device 305 may be accumulated in a tank 307. The feedstock may then be directed from the tank 307 to the valve system 308 or the oxygenate synthesis device 312.

The valve system 308 directs the various fuels (e.g., hydrocarbon, feedstock, such as syngas, and the effluent of the oxygenate synthesis device 312, such as an oxygenate compound) to the engine 318 through a direct injection path 317 or the indirect injection path 319. The direct injection path or the indirect injection path can be selected based upon engine speed, engine load conditions and engine performance. A pressure regulator 309 can be used to control the pressure to the direct injection path 317 and a pressure regulator 310 can be used to control the pressure to the indirect injection path 319. Excess pressure from the direct injection path 317 or the indirect injection path 319 may be bled off and provided to the hydrocarbon source 300, if desired. The indirect injection path 319 is a path of fluid (e.g., gases and/or liquids) to be indirectly fed to the engine 318. The engine system 400 include one or more of the direct injection path 317 and/or one or more indirect injection path 319.

The feedstock (e.g., syngas) directed to the oxygenate synthesis device 312 can be heat exchanged with heat energy from the heat exchange network 322 via a heat exchanger 311 prior to reaching the oxygenate synthesis device. Heat exchanging the feedstock prior to reaching the oxygenate synthesis device 312 facilitates maintenance of the temperature of the oxygenate synthesis device 312. For example, in some embodiments, the oxygenate synthesis device may be maintained at a temperature of about 250° C.

The oxygenate synthesis device 312 receives heated feedstock (e.g., syngas) from the heat exchanger 311 and converts the feedstock to the oxygenate compound or mixture of oxygenate compounds as described above. The oxygenate synthesis device 312 is a chemical reactor including the catalyst and may be a plug flow reactor, tube and shell reactor, and/or another design such as a micro-channel and/or substrate bound catalyst reactor. For example, a micro-channel reactor design having relatively smaller reactor paths (e.g., smaller than those of other reactors, such as plug flow reactors) and thin layers of catalyst allow for suitable catalyst fluid interaction and may be placed within close proximity to a heat exchange path, allowing for enhanced energy efficiency of the reactor.

The effluent of the oxygenate synthesis device 312 (e.g., the oxygenate compound or mixture of oxygenate compounds) is directed to a recuperative heat exchanger 313, which is a component of the heat exchange network 322. The recuperative heat exchanger 313 recovers heat energy from the reactor effluent (e.g., the oxygenate compound or mixture of oxygenate compounds) to increase the efficiency of the engine system 400. One embodiment of a recuperative heat exchanger is shown in FIG. 5.

An accumulator/phase separator device 314 is in direct fluid communication with the heat exchanger 313 and allows for accumulation or storage of oxygenate compounds for delivery to the engine 318. The accumulator/phase separator 314 reduces (or minimizes) pressure fluctuations in the engine system 400 and allows unreacted feedstock (e.g., syngas) to be recovered and directed to the valve system 308, which may then deliver the unreacted feedstock to the engine 318 through the indirect injection path 310. In some embodiments of the engine system 400, the unreacted feedstock may be redirected to the oxygenate synthesis device 312, or it may be directed to the indirect injection path 319 via the valve system 308 for injection into a combustion chamber 398.

The oxygenate synthesis device 312 produces an oxygenate fuel composition (e.g., a composition including the oxygenate compound or mixture of oxygenate compounds) that is eventually delivered to the fuel injection system of the engine 318, which meters the oxygenate compound or mixture of oxygenate compounds into the engine (e.g., into the combustion chamber 398) and the oxygenate fuel composition is combusted in the combustion chamber 398. The fuel injection system may include both direct and indirect (e.g., port or fumigation) injection, or it may independently include direct or indirect injection. In certain embodiments, the oxygenate fuel composition is cooled prior to being combusted in the engine 318. For example, prior to combustion in the engine 318, the oxygenate fuel composition (e.g., the reactor effluent from the oxygenate synthesis device 312) may be cooled by way of heat exchange.

For example, oxygenate compounds produced via the oxygenate synthesis device 312 may be directed to the engine 318 via the direct injection path 317 through a high pressure direct injector 397. In some embodiments, the oxygenate compounds are directed to the direct injector by a high pressure pump 316. In some embodiments, the high pressure pump 316 and direct injector 397 may be combined as one, for example, when the direct injector is a "unit" injector. The direct injector 397 delivers suitable amounts of the oxygenate compounds to the combustion chamber 398 of the engine 318 for combustion. The direct injector 397 may also deliver other fluids of the engine system 400 to the combustion chamber 398 of the engine 318. The indirect injection path 319 delivers the hydrocarbon, feedstock and/or other fluids of the engine system 400 to an air intake system 323 through an injector 396 (e.g., an indirect injector). The fluid (e.g., hydrocarbon and/or syngas) is injected into the air intake system 323 and introduced via an air intake valve 320 of the engine 318.

Exhaust gas produced by the engine 318 may be directed to a turbocharger 321. The turbocharger 321 is a turbine that uses the exhaust gas to increase the pressure of the air provided to the air intake system 323, thereby increasing the pressure in the combustion chamber 398. Air (e.g., fresh air or external air) is directed through an air filter 324 and then fed directly to the turbocharger 321 to be compressed and forced into the air intake system 323. The air is then fed directly to the engine 318 via the air intake valve 320 of the engine system 400. A heat exchange system 326 (e.g., a water/air cooler 326) cools the effluent air from the turbocharger 321 using water and/or other coolants 327. The heat extracted from the effluent air of the turbocharger 321 can be directed to the heat exchange network 322 to provide a more energy efficient engine system 400.

The engine system 400 shown in FIG. 4 may include other additional inter-connections between the various components that are not shown. For example, the engine system 400 may include additional inter-connections to provide for the above-described heat exchange and/or alternative approaches to direct the various fuels into the engine 318 via the direct injection path 317 and/or the indirect injection path 319. Additionally, the engine system 400 may include one or more of each of the above-described components, for example, the engine system 400 may include two or more combustion chambers.

An example of one embodiment of a recuperative heat exchanger 485 is shown in FIG. 5. The recuperative heat exchanger 485 includes an oxygenate fuel composition inlet 486, which introduces the hot oxygenate fuel composition 455 into the recuperative heat exchanger. The recuperative heat exchanger further includes an oxygenate fuel outlet 487. The hot oxygenate fuel composition 455 exits the recuperative heat exchanger 485 through the oxygenate fuel outlet 487. In this embodiment, the recuperative heat exchanger includes a feedstock inlet 489 that allows cool feedstock (e.g., fuel) to enter the heat exchanger at 489. The recuperative heat exchanger also includes a feedstock outlet 488, which allows the heated fuel or feedstock to exit the recuperative heat exchanger. The recuperative heat exchanger 485 may also include baffles 491. The baffles may facilitate heat exchange.

The recuperative heat exchanger 485 cools the reactor effluent (e.g., the oxygenate fuel composition), which is directed towards the engine's fuel injection system, and heats the fuel or feedstock, e.g., syngas, being directed towards the oxygenate synthesis device. That is, the recuperative heat exchanger 485 extracts heat from the oxygenate fuel composition, and transfers the heat to the fuel or feedstock, e.g., syngas, prior to the fuel or feedstock being reacted in the oxygenate synthesis device. If the fuel injection system requires a heated stream of fuel, however, the recuperative heat exchanger may be omitted.

Figure 6:
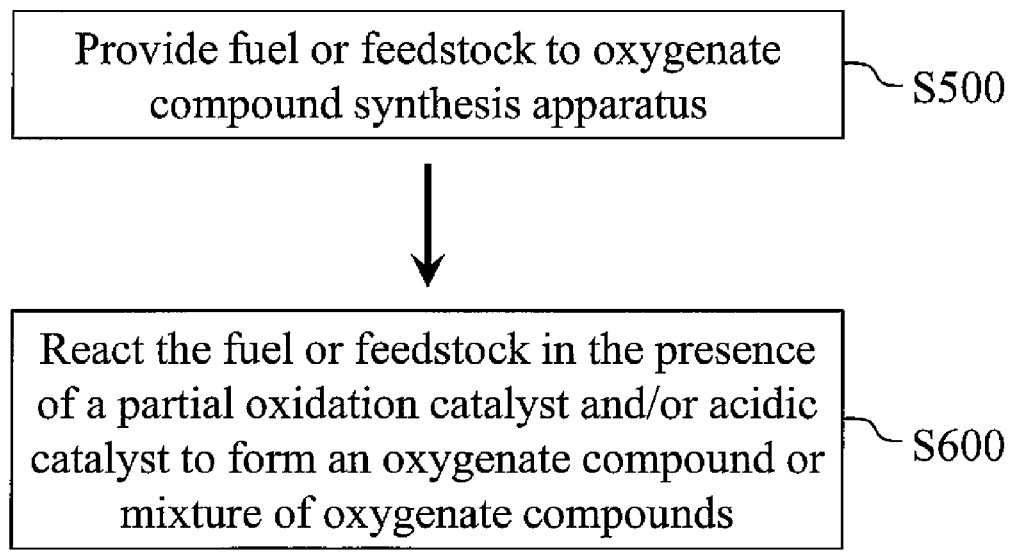
FIG. 6 is a flow chart illustrating the synthesis of an oxygenate compound or mixture of oxygenate compounds according to an embodiment of the invention.

Methods of synthesizing an oxygenate compound or mixtures of oxygenate compounds according to exemplary embodiments of the invention will now be described in more detail. For example, FIG. 6 is a flow chart generally showing the synthesis of an oxygenate compound or mixture of oxygenate compounds according to an exemplary embodiment of the invention. In S500 of FIG. 6, a fuel or feedstock is provided to the oxygenate compound synthesis apparatus. In one embodiment, the fuel or feedstock is syngas (e.g., a mixture of $H_2$, CO and/or $CO_2$) obtained from any suitable source, such as, for example, natural gas, diesel fuel, biomass, or ethanol, but the invention is not limited thereto. The fuel or feedstock may be provided to the oxygenate compound synthesis apparatus by any suitable device, such as, for example, a pump, pressure maintaining device, and/or regulator. The fuel or feedstock may further include exhaust gas from an internal combustion engine. For example, the fuel or feedstock may further include, among other things, $CO_2$ received from an internal combustion engine. As the fuel or feedstock is provided to the apparatus, pressure may be released to, for example, the internal combustion engine.

During operation, the syngas is exposed to the catalyst, and an effluent that may include, among other things, a mixture of methanol, DME, carbon dioxide, additional alcohols, ethers, aldehydes, and water is produced. As shown in S600, the fuel or feedstock is reacted in the presence of a partial oxidation catalyst and/or acidic catalyst. For example, the fuel or feedstock may be reacted in the presence of a bifunctional and/or hybrid catalyst as described herein. As the fuel or feedstock (e.g., syngas) passes through the oxygenate synthesis device 20, at least a portion of the fuel or feedstock is converted to an oxygenate compound or mixture of oxygenate compounds, which may be used as an oxygenate fuel composition. The oxygenate compound or mixture of oxygenate compounds may be present in the oxygenate fuel composition in an amount in a range of about 1 to about 50 vol % based on the total volume of the oxygenate fuel composition. The oxygenate compound or mixture of oxygenate compounds may include, for example, dimethyl ether, as part of the oxygenate fuel composition.

Syngas typically includes a mixture of $H_2$, CO, and $CO_2$, which can be used to produce, among other things, DME and $CO_2$. For example, in one embodiment of S600, syngas may be used to produce DME, methanol and water through the following reactions:

$CO + 2H_2 \leftrightarrow CH_3OH$     Reaction 1:

$2CH_3OH \rightarrow CH_3OCH_3 + H_2O$     Reaction 2:

The above-identified reactions typically do not proceed to 100% conversion, and therefore, various amounts of each component are typically present in the effluent from the oxygenate synthesis device 20. The oxygenate fuel composition (e.g., the feed including the oxygenate compound or mixture of oxygenate compounds) prepared by the oxygenate synthesis device 20, is much more readily ignited by compression than the original fuel or feedstock (e.g., syngas). As such, the oxygenate compound or mixture of oxygenate compounds is suitable for use as a source of fuel for compression ignition in the engine.

In addition to the oxygenate compound or mixture of oxygenate compounds, the oxygenate fuel composition may further include $CO_2$, $H_2$, CO, $H_2O$, alcohols and/or additional ethers. Accordingly, the oxygenate fuel composition (e.g., reactor effluent) may be further treated to remove $CO_2$ before it used as a fuel by an engine. The oxygenate fuel composition may also be treated to add a lubricant before it is used as a fuel by an engine.

For example, the oxygenate compound or mixture of oxygenate compounds may be mixed with the lubricant to arrive at a concentration of lubricant in a range of about 1 to about 1000 ppm. The oxygenate compounds may be mixed with the lubricant at any time. For example, the lubricant may be mixed with the oxygenate compounds concurrently with their synthesis or at any time after the oxygenate compounds have been synthesized. Alternatively, or additionally, the lubricant may be mixed the fuel or feedstock before the oxygenate compounds are synthesized. In one embodiment, the lubricant is introduced by way of a pump injector.

The oxygenate compound synthesis device converts a fuel or feedstock, such as, for example, syngas, to an oxygenate rich mixture under a variety of conditions, including mild conditions. For example, the reaction may occur at a temperature of 250° C. The pressure may be about 50 bar. The flow rate may be about 500 mL/g·hr. The reaction conditions are further described below in Table 1.

TABLE 1

| Parameter | Values/Type | | |
|---|---|---|---|
| | Operating | Maximum | Minimum |
| Fuel or Feedstock | Syngas, DME, methanol, $CH_4$, and/or other hydrocarbons | | |
| DME production | 80% | 95% | 60% |
| Pressure (bar) | 5 to 100 | 300 | 0 |
| Temperature (° C.) | 250 | 450 | 150 |
| Syngas feed flow rate (L/min) | 51.7 | 100 | |
| Space velocity ($mL/g_{cat}$ · hr) | 500 | | |
| Catalyst | Inorganic in nature, zeolite and metal oxide | | |
| Mass of catalyst (kg) | 6.2 | | |
| Density of catalyst (kg/L) | 0.55 | | |
| Volume of reactor (L) | 11.3 | 11.5 | 11 |
| Catalyst pellet size (mm) | 1.2 | 2 | 0.5 |
| $\varnothing_{reactor}/\varnothing_{pellet}$ | ≥5 | | 5 |
| $\varnothing_{reactor}$ (mm) | ≥6 | | |
| L/D of reactor | ≥15 | | |

Figure 7:
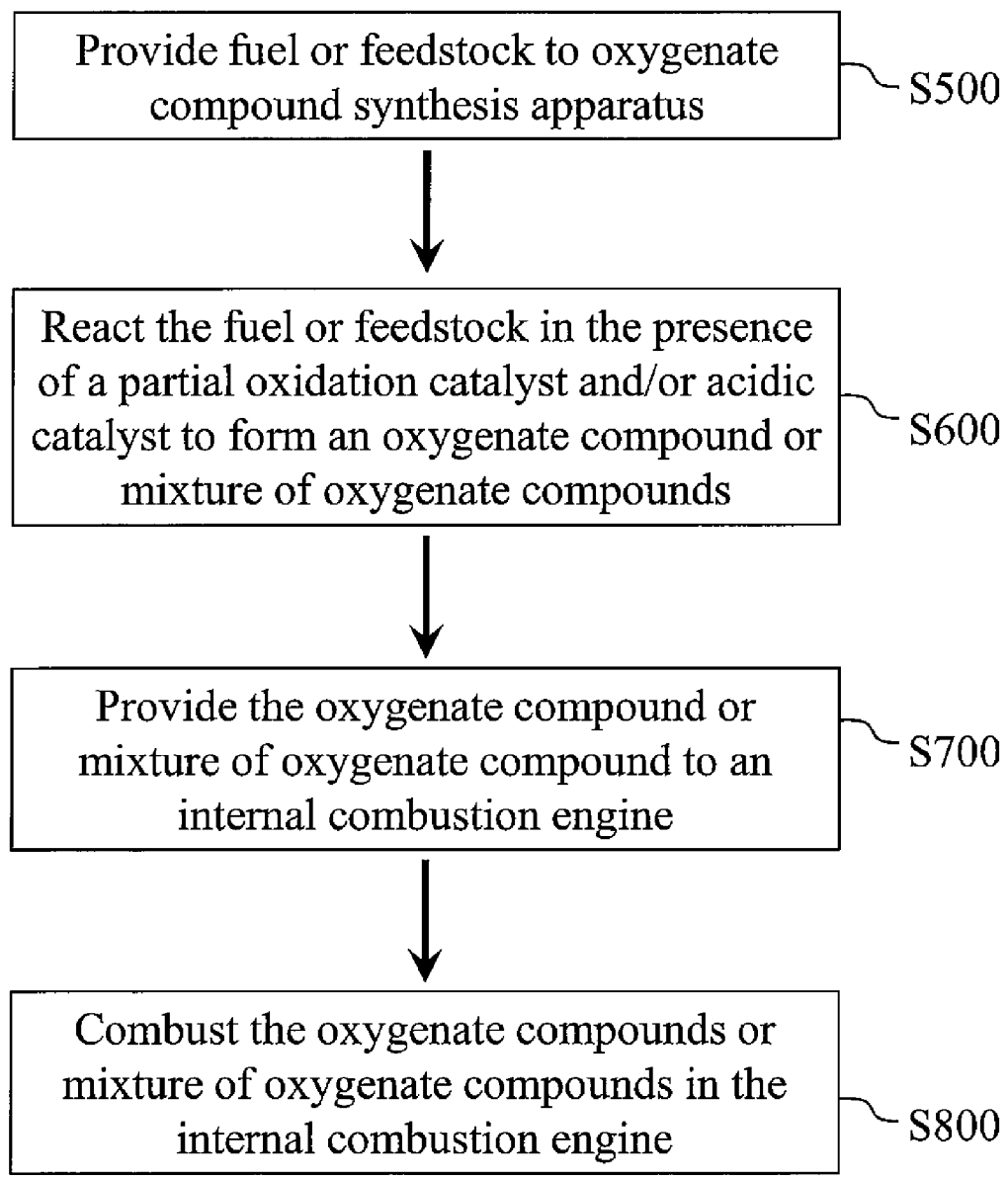
FIGS. 7-10 are flow charts illustrating syntheses of an oxygenate compound or mixture of oxygenate compounds for an engine.

As shown in FIG. 7, embodiments of the invention also include methods of synthesizing the oxygenate compound or mixture of oxygenate compounds and using the oxygenate compound or mixture of oxygenate compounds as fuel for an engine (e.g., methods of providing an oxygenate compound or mixture of oxygenate compounds to an engine). In FIG. 7, S500 and S600 are the same or substantially the same as described in the previous embodiment, and therefore, further description thereof will be omitted. FIG. 7 also includes S700, in which the oxygenate compound or mixture of oxygenate compounds are provided to an internal combustion engine. In S800, the oxygenate compound or mixture of oxygenate compounds are combusted in the internal combustion engine. Systems and methods for synthesizing an oxygenate compound or mixture of oxygenate compounds, providing the oxygenate compound or mixture of oxygenate compounds to an internal combustion engine as a fuel for combustion are further illustrated in FIGS. 8-10.

Figure 8:
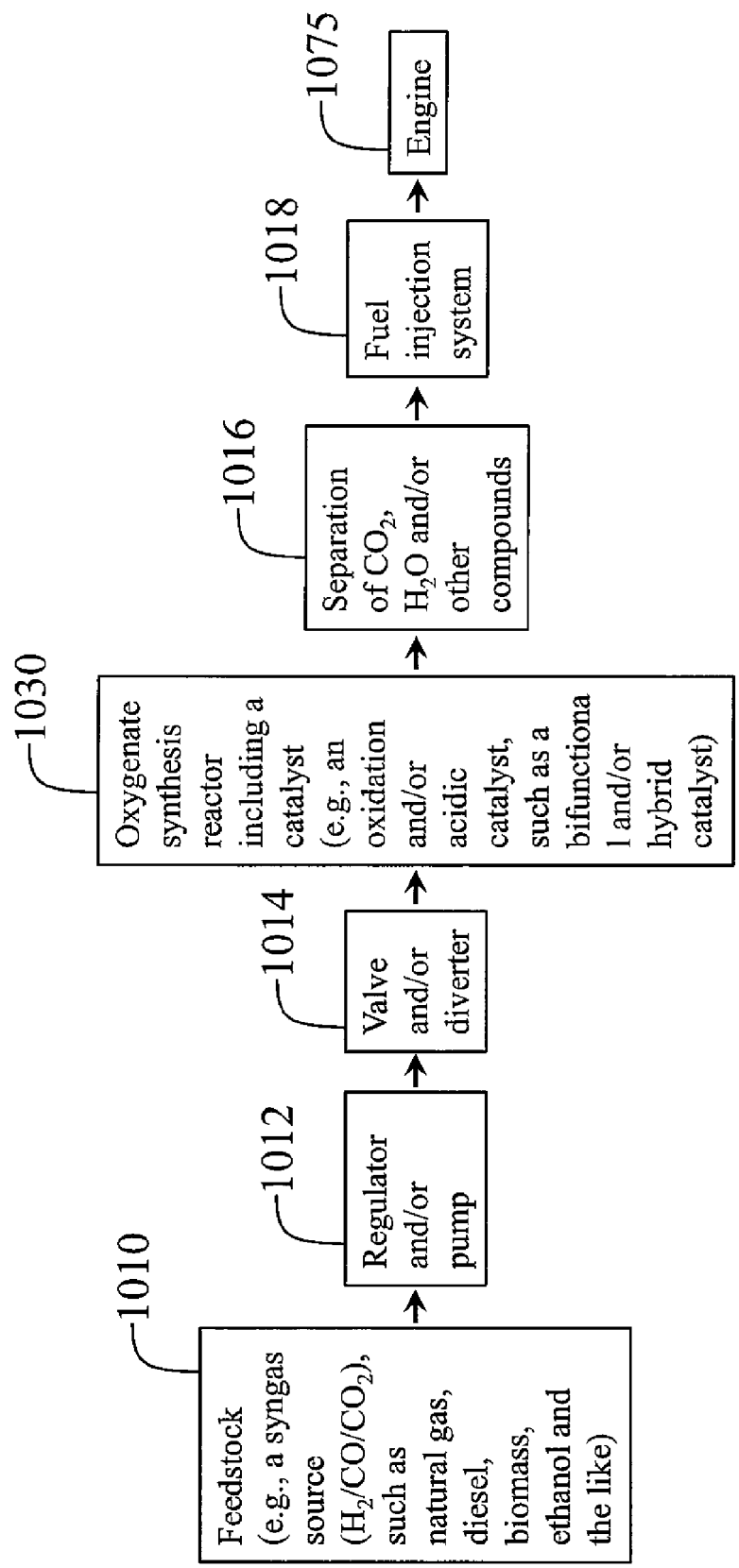

For example, FIG. 8 is a flow chart illustrating the conversion of a feedstock to an oxygenate fuel composition for use in an engine. In FIG. 8, a feedstock 1010 (e.g., a syngas source ($H_2$/CO/$CO_2$), such as natural gas, diesel, biomass, ethanol and the like) is supplied through a regulator (e.g., a pump) 1012 and a valve (e.g., a diverter) 1014 to an oxygenate synthesis reactor 1030. The oxygenate synthesis reactor 1030 converts the feedstock to an oxygenate fuel composition as described above. A separator 1016 separates $CO_2$, $H_2O$ and/or other compounds (e.g., contaminants) from the oxygenate fuel composition, which is then supplied to a fuel injection system 1018. The fuel injection system 1018 then supplies the oxygenate fuel composition to an engine 1075.

Figure 9:
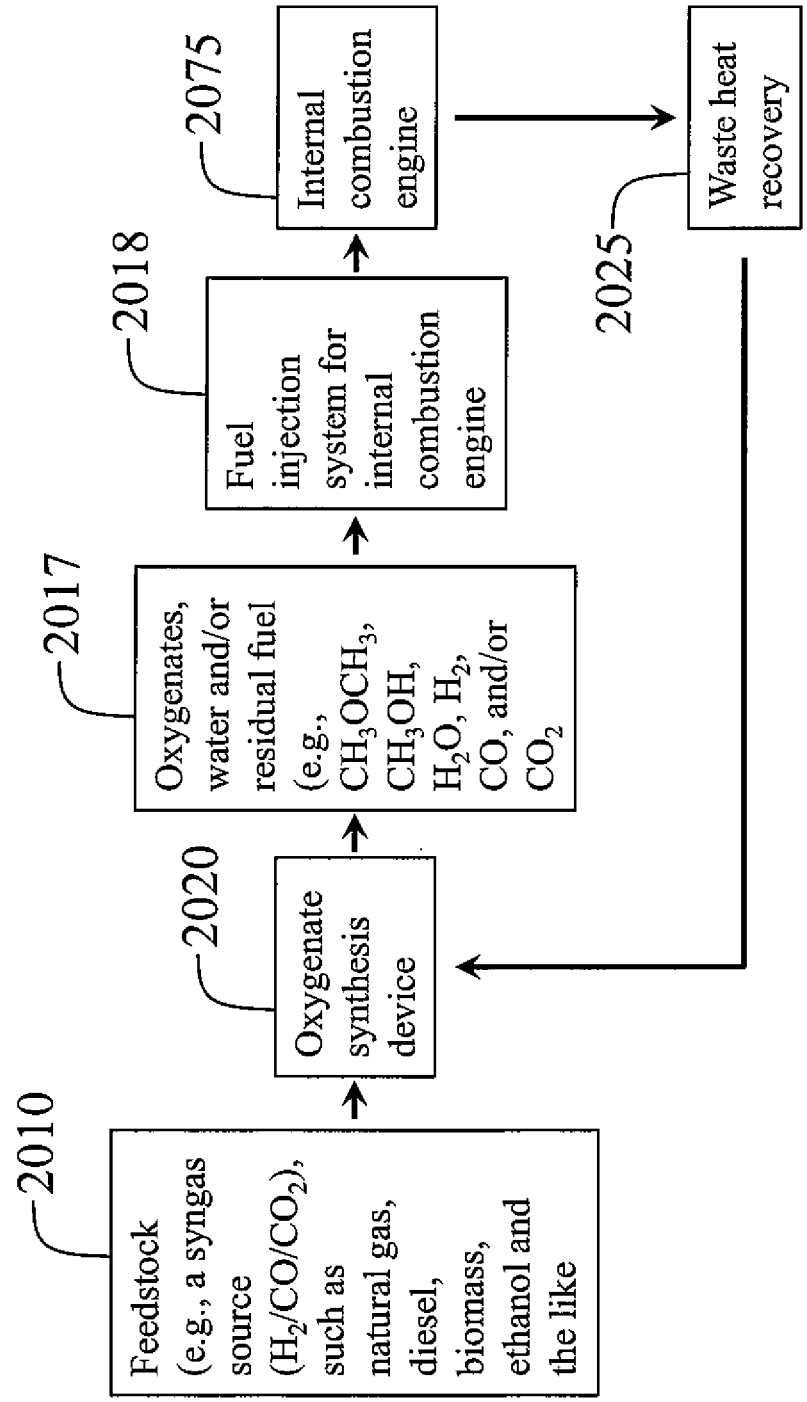

FIG. 9 is a flow chart illustrating another embodiment in which a feedstock 2010 (e.g., a syngas source ($H_2$/CO/$CO_2$), such as natural gas, diesel, biomass, ethanol and the like) is supplied to an oxygenate synthesis device 2020. The oxygenate synthesis device 2020 converts the feedstock to an oxygenate fuel composition 2017 as described above. The oxygenate fuel composition is then supplied to a fuel injection system 2018. The fuel injection system 2018 supplies the oxygenate fuel composition to an internal combustion engine 2075. Waste heat 2025 is recovered from the internal combustion engine 2075 and supplied to the oxygenate synthesis device 2020 to facilitate conversion of the feedstock to the oxygenate fuel composition.

Figure 10:
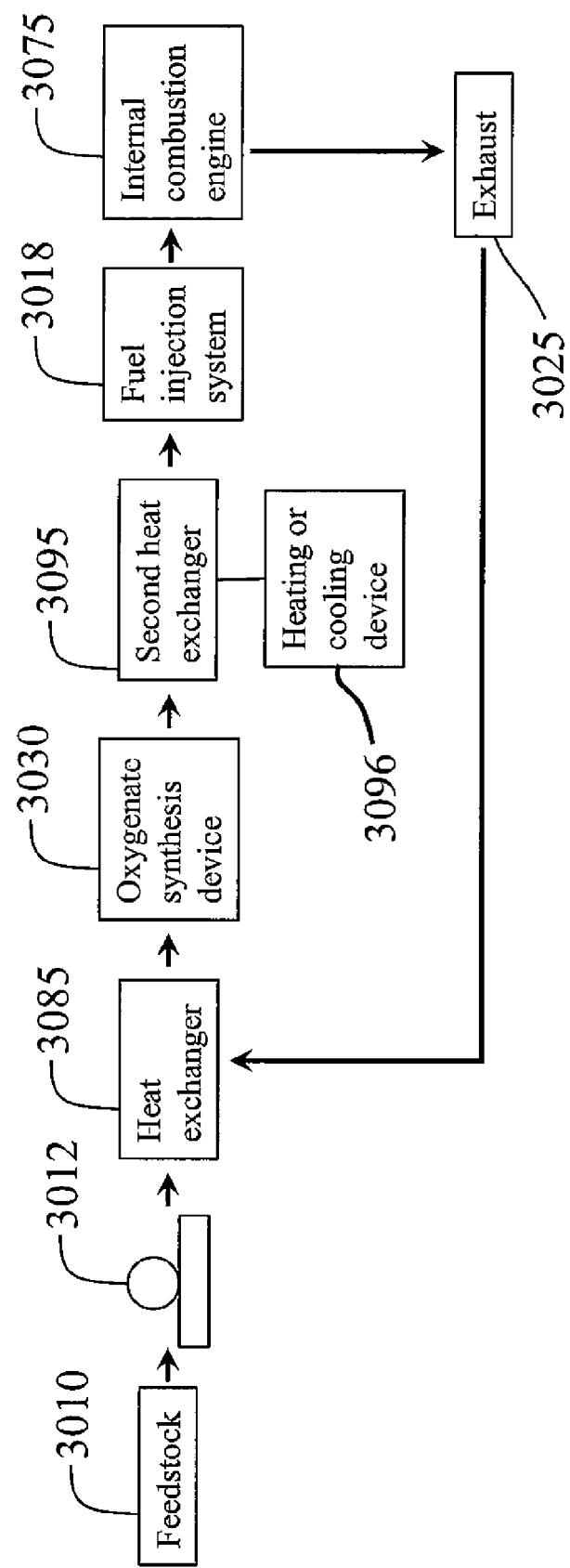

FIG. 10 is a flow chart illustrating another embodiment in which a fuel (e.g., a feedstock) 3010 is supplied by a pump 3012 to a heat exchanger 3085 and then to an oxygenate synthesis reactor 3030. The oxygenate synthesis device 3030 converts the feedstock to an oxygenate fuel composition as described above. The oxygenate fuel composition is then supplied to a second heat exchanger 3095 for heat exchange with a heating or cooling device 3096, and is then a fuel injection system 3018. The fuel injection system 3018 supplies the oxygenate fuel composition to an engine 3075. Exhaust (e.g., waste heat) 3025 is recovered from the internal combustion engine 2075 and supplied to the heat exchanger 3085 to heat the fuel.

The composition of the output from the oxygenate synthesis device depends upon various parameters. For example, the composition of the output from the oxygenate synthesis device may be modified by varying process parameters, such as, but not limited to, the temperature at which the device is operated, the volume of the device, the pressure, chemical concentrations of the reactants, heat transfer coefficients, catalyst material used in the device and amount of catalyst/surface area. The resulting fuel composition can be tailored to the various engine operating conditions which are based upon factors such as air/fuel ratio, load, speed, engine temperature, air intake temperature and engine compression ratio.

In an embodiment of the invention, the oxygenate synthesis device is configured to produce only the amount of oxygenate fuel composition required for the operation of the engine. For example, the oxygenate fuel composition may be altered based on engine operating conditions. As an example, if the engine is operating in compression ignition mode and the engine load is relatively low, the amount and type of oxygenate fuel composition to be produced will be an amount that is sufficient to cause compression ignition to occur. Additional amounts of oxygenate fuel composition could be produced if reduction of harmful emissions such as particulate matter, unburnt hydrocarbons or nitrous oxides would occur. Conversely, the oxygenate synthesis device may configured to produce more syngas and/or oxygenate compounds, for example when the engine is at high engine load operation. The oxygenate synthesis device may be configured according to the desired properties of the output fuel. For example, the volume of the reactor maybe chosen such that the reactor is able to meet the production requirements of the oxygenate fuel composition for the engine's fuel consumption requirements.

As set forth above, embodiments of the invention are directed to an oxygenate compound synthesis device and to methods of synthesizing oxygenate compounds. Oxygenate compounds may be synthesized from a feedstock, such as syngas, but the present invention is not limited thereto. By synthesizing oxygenate compounds within the fuel delivery system of an engine system, embodiments of the invention may improve the performance of an engine. For example, synthesizing oxygenate compounds produces compounds that are readily ignited by compression ignition than are the compounds of the feedstock. Alternatively, synthesizing oxygenate compounds produces compounds that reduce undesirable engine emissions. In certain embodiments, these benefits are enabled by utilizing heat from the engine.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise. While various embodiments of the present invention have been described above, it should be understood that they have been presented by way of example only, and not of limitation.

Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An internal combustion engine system comprising:
   a fuel system comprising an oxygenate compound synthesis device comprising a reactor comprising a catalyst, the oxygenate compound synthesis device being configured to convert at least a portion of a feedstock to an oxygenate compound or a mixture of oxygenate compounds, the oxygenate compound or the mixture of oxygenate compounds comprising dimethyl ether; and
   an internal combustion engine configured to initiate combustion through compression or high energy discharge, the internal combustion engine comprising:
      a fuel injection system configured to provide the oxygenate compound or mixture of oxygenate compounds to a combustion chamber of the internal combustion engine, and
      a cooling system configured to cool the internal combustion engine,
   the internal combustion engine being configured to heat the oxygenate compound synthesis device using heat from the cooling system of the internal combustion engine.

2. The internal combustion engine system of claim 1, wherein the reactor is a plug flow reactor (PFR) comprising an elongated tube, and the catalyst is positioned inside the elongated tube.

3. The internal combustion engine system of claim 1, wherein the reactor is a shell and tube heat exchanger comprising a shell surrounding a plurality of elongated reactor tubes, and the catalyst is positioned inside the elongated reactor tubes.

4. The internal combustion engine system of claim 1, wherein the catalyst is a partial oxidation catalyst.

5. The internal combustion engine system of claim 4, wherein the partial oxidation catalyst comprises a material selected from the group consisting of zinc, chromium, copper, platinum, palladium, cobalt, iron, rhodium, cerium, molybdenum, oxides thereof, and mixtures thereof.

6. The internal combustion engine system of claim 5, wherein the partial oxidation catalyst further comprises a material selected from the group consisting of carbon, silicon, sulfur, selenium and mixtures thereof.

7. The internal combustion engine system of claim 4, wherein the partial oxidation catalyst is supported on a support selected from the group consisting of alumina, chromium oxide, silicon carbide, silica, zirconia, titania, and combinations thereof.

8. The internal combustion engine system of claim 4, wherein the oxygenate compound synthesis device further comprises an acidic catalyst.

9. The internal combustion engine system of claim 8, wherein the acidic catalyst is selected from the group consisting of zeolites, aluminas, silica-aluminas, nitrogen treated acidic catalysts and mixtures thereof.

10. The internal combustion engine system of claim 1, wherein the oxygenate compound synthesis device is configured to provide an oxygenate fuel composition comprising the oxygenate compound or the mixture of oxygenate compounds, the oxygenate compound or mixture of oxygenate compounds being present in the oxygenate fuel composition in an amount in a range of about 1 to about 50 vol % based on the total volume of the oxygenate fuel composition.

11. A fuel system for an internal combustion engine, comprising:
- an oxygenate compound synthesis device in fluid communication with a feedstock supplier and configured to be in fluid communication with a fuel injection system of an internal combustion engine;
- wherein the oxygenate compound synthesis device is configured to receive a feedstock from the feedstock supplier,
- wherein the oxygenate compound synthesis device is configured to convert at least a portion of the feedstock to an oxygenate compound or a mixture of oxygenate compounds, the oxygenate compound or the mixture of oxygenate compounds comprising dimethyl ether, and
- wherein the oxygenate compound synthesis device is configured to provide an oxygenate fuel composition comprising the oxygenate compound or mixture of oxygenate compounds to the fuel injection system.

12. The fuel system of claim 11, wherein the oxygenate compound synthesis device comprises a reactor configured to be heated using heat from at least one of exhaust gas of the internal combustion engine, effluent produced by the oxygenate compound synthesis device, an electrical heater, the internal combustion engine cooling system, or combustion of the feedstock.

13. The fuel system of claim 11, wherein the oxygenate synthesis device is configured to vary composition of the oxygenate fuel composition according to load conditions of the internal combustion engine.

14. The fuel system of claim 11, further comprising a feedstock pump between the feedstock supplier and the oxygenate compound synthesis device, wherein the feedstock pump is configured to maintain a feedstock pressure at the oxygenate compound synthesis device.

15. The fuel system of claim 11, wherein the oxygenate compound synthesis device comprises a partial oxidation catalyst and an acidic catalyst.

16. The fuel system of claim 11, wherein the oxygenate compound or the mixture of oxygenate compounds is present in the oxygenate fuel composition in an amount in a range of about 1 to about 50 vol % based on the total volume of the oxygenate fuel composition.

17. A method of providing an oxygenate compound or mixture of oxygenate compounds to an internal combustion engine, the method comprising:
- reacting a feedstock in an oxygenate synthesis device in the presence of a partial oxidation catalyst and an acidic catalyst to form the oxygenate compound or mixture of oxygenate compounds, the oxygenate compound or the mixture of oxygenate compounds comprising dimethyl ether; and
- directing the oxygenate compound or mixture of oxygenate compounds to an internal combustion engine.

18. The method of claim 17, wherein the oxygenate compound synthesis device is configured to provide an oxygenate fuel composition comprising the oxygenate or the mixture of oxygenate compounds in an amount in a range of about 1 to about 50 vol % based on the total volume of the oxygenate fuel composition.

* * * * *